United States Patent
Barker

(10) Patent No.: US 6,796,260 B1
(45) Date of Patent: Sep. 28, 2004

(54) ELASTOMERIC EJECTION SYSTEM WITH ACOUSTICALLY IMPROVED CHECK VALVE

(75) Inventor: William P. Barker, Bristol, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/657,773

(22) Filed: Sep. 8, 2003

(51) Int. Cl.[7] .................................................. B63B 1/00
(52) U.S. Cl. ..................... 114/238; 114/319; 124/70; 137/514.7
(58) Field of Search .................................. 114/238, 239, 114/316–319; 89/1.809, 1.81; 42/1.14; 124/70, 71; 137/514, 514.3, 514.5, 514.7; 251/12, 14, 48, 50, 54

(56) References Cited

U.S. PATENT DOCUMENTS

| | | | |
|---|---|---|---|
| 1,710,214 A | * 4/1929 | Hassold | 137/331 |
| 2,870,779 A | * 1/1959 | Thomiszer | 137/219 |
| 3,134,394 A | * 5/1964 | Ohta | 137/220 |
| 3,194,255 A | * 7/1965 | Flaton et al. | 137/220 |
| 3,605,802 A | * 9/1971 | Hertell | 137/514.5 |
| 4,077,425 A | * 3/1978 | Drori | 137/219 |
| 4,693,270 A | * 9/1987 | Yaindl | 137/514.3 |
| 4,766,929 A | * 8/1988 | Yaindl | 137/514.3 |
| 4,848,210 A | 7/1989 | Bissonnette | |
| 5,123,370 A | 6/1992 | Woidich et al. | |
| 5,200,572 A | 4/1993 | Bissonnette et al. | |
| 5,438,945 A | 8/1995 | Moody | |
| 5,438,948 A | 8/1995 | Moody | |
| 5,562,065 A | 10/1996 | Duarte et al. | |
| 5,848,929 A | 12/1998 | Hoffman | |
| 5,921,276 A | * 7/1999 | Lam et al. | 137/514.7 |
| 6,073,651 A | * 6/2000 | Conrads et al. | 137/556 |
| 6,079,347 A | 6/2000 | Lieb | |
| 6,132,191 A | * 10/2000 | Hugenroth et al. | 418/55.1 |
| 6,146,114 A | 11/2000 | Nardacci et al. | |
| 6,216,626 B1 | 4/2001 | Curtis | |
| 6,220,196 B1 | 4/2001 | Escarrat | |
| 6,386,133 B1 | * 5/2002 | Ryerson et al. | 114/238 |
| 6,443,182 B1 | 9/2002 | Hathcock | |

* cited by examiner

*Primary Examiner*—S. Joseph Morano
*Assistant Examiner*—Ajay Vasudeva
(74) *Attorney, Agent, or Firm*—James M. Kasischke; Michael P. Stanley; Michael F. Oglo

(57) ABSTRACT

A system for launching bodies from a submarine includes a pump for transferring seawater to an elastomeric ejection tank, and a check valve that permits transfer of the seawater to the tank, and closes upon filling of the tank. The valve includes a head and a seat, a stem having fixed thereon the head and a disk having a circular protrusion extending toward the seat, a cup mounted around the stem and having a circular depression in a surface thereof, and radially extending holes disposed in the cup. During valve closure, the disk protrusion enters the cup depression forcing water in the depression to exit the cup through a primary restrictive path of an annular gap between the protrusion and depression and a secondary restrictive path of the radially extending holes, to slow the valve head in movement during engagement with the valve seat.

19 Claims, 4 Drawing Sheets

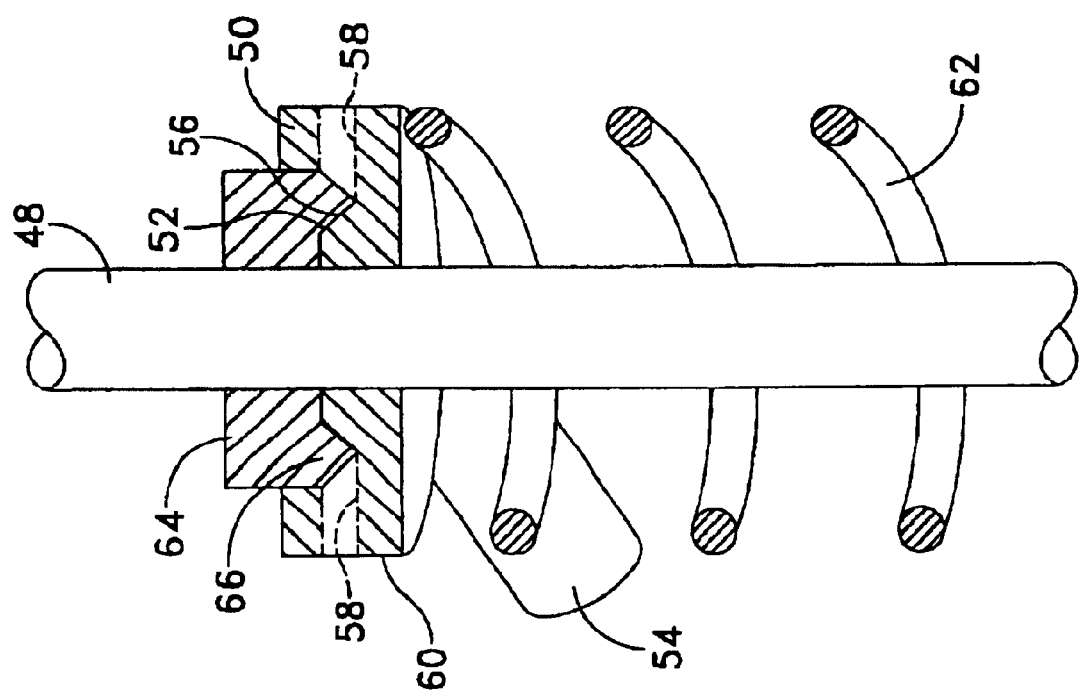

ELASTOMERIC EJECTION SYSTEM WITH ACOUSTICALLY IMPROVED CHECK VALVE

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The invention relates to elastomeric ejection systems for submarines, and is directed more particularly to such a system including an improved check valve affording substantially quieter operation than traditional check valves.

(2) Description of the Prior Art

Elastomeric ejection systems for submarines are generally known and are used to launch torpedoes and other weapons and vehicles, hereinafter referred to collectively as "bodies", from the torpedo tubes. Examples of such systems are illustrated and described in U.S. Pat. No. 4,848,210, issued Jul. 18, 1989 in the name of Laurent C. Bissonnette, in U.S. Pat. No. 5,200,572, issued Apr. 6, 1993, in the names of Laurent C. Bissonnette et al, and in U.S. Pat. No. 5,438,948, issued Aug. 8, 1995, in the name of Paul E. Moody, all incorporated herein by reference.

In such systems the driving force for launching the bodies from the torpedo tubes is pressurized seawater, and the pressurization of the seawater is accomplished by storing a charge of seawater in an expandable elastomeric disk or structure. To charge the elastomeric disk or structure with seawater, a sea valve is provided in communication with a charging pump which is in communication with an inlet cylinder which, in turn, is in communication with the elastomeric disk or structure.

Between the charging pump and the inlet cylinder there is a check valve which, in a charging operation, allows seawater to flow from the pump to the inlet cylinder. However, once the elastomeric disk or structure is filled to capacity and the pressure in the elastomeric disk or structure and the inlet cylinder reaches launch pressure, the pump shuts down and a check valve shuts to prevent back-flow through the charging pump. The check valve typically makes a discernible noise upon closure. The noise can be detected by sensitive listening devices, permitting a target vessel a brief period of time in which to take evasive maneuvers in hopes of reducing the chances of a successful attack.

In U.S. Pat. No. 6,443,182, issued Sep. 3, 2002, in the name of Lance Hathcock, a non-slamming check valve is disclosed. While the disclosed valve has a dampening effect on the wear produced by the valve closure, the noise of the valve is shifted from the closure to the dampening operation.

Specifically, a bleed hole (item 36 of the cited reference) in a dampening chamber (item 28) provides the pressure release of the dampening operation. The problem is that the passage area of the bleed hole is minimal in comparison to the remaining pressurized area of the valve (item 12). In a high-pressure environment, such as an elastomeric ejection system, a pressure release through the bleed hole may be loud, therefore not successfully accomplishing noise reduction. Furthermore, the comparatively minimal size of the bleed hole may inhibit the rapid closure response required by an elastomeric ejection system allowing the elastomer to deflate from its full volume effectively decreasing the energy available for launch.

Accordingly, there is a need for an elastomeric ejection system in which the check valve operates at a much lower sound level and in a rapid operation when the elastomeric disk or structure is made ready for launch.

SUMMARY OF THE INVENTION

An object of the invention is, therefore, to provide an improved elastomeric ejection system for submarines, the system featuring a substantially silent check valve, the operation of which is not readily detectable by other vessels.

With the above and other objects in view, a feature of the invention is the provision of an elastomeric ejection system for launching bodies from a submarine. The system comprises a pump for transferring seawater from outside the submarine to an elastomeric disk or structure and a check valve adapted to open to permit the pump to transfer the seawater to the elastomeric disk or structure, and adapted to rapidly close upon filling of the elastomeric disk or structure and expanding of the elastomeric disk or structure. The check valve is provided with a head and a seat portion, a stem portion having fixed thereon the head and a disk having a circular protrusion extending toward the valve seat portion, an annular cup stationarily mounted around the stem portion and having a circular depression in a surface thereof, the depression configured complementarily to the disk protrusion, and holes disposed in the cup and radially extending from the depression to an outer wall of the cup. In closure of the check valve, the disk circular protrusion enters the cup depression, forcing seawater in the depression to exit the cup through the flow restrictive paths comprised by the primary path of the decreasing annular gap between the disk protrusion and cup depression and the secondary path of the radial holes, to slow the valve stem portion, and thereby the valve head in movement into engagement with the valve seat portion.

The above and other features of the invention, including various novel details of construction and combinations of parts, will now be more particularly described with reference to the accompanying drawings and pointed out in the claims. It will be understood that the particular system embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, wherein corresponding reference characters indicate corresponding parts throughout the several views of the drawings and wherein:

FIG. 4 is an enlarged sectional and perspective view of a portion of the check valve of FIG. 3.

DESCRIPTION OF THE PREFERRED EMBODIMENTS

Figure 1:
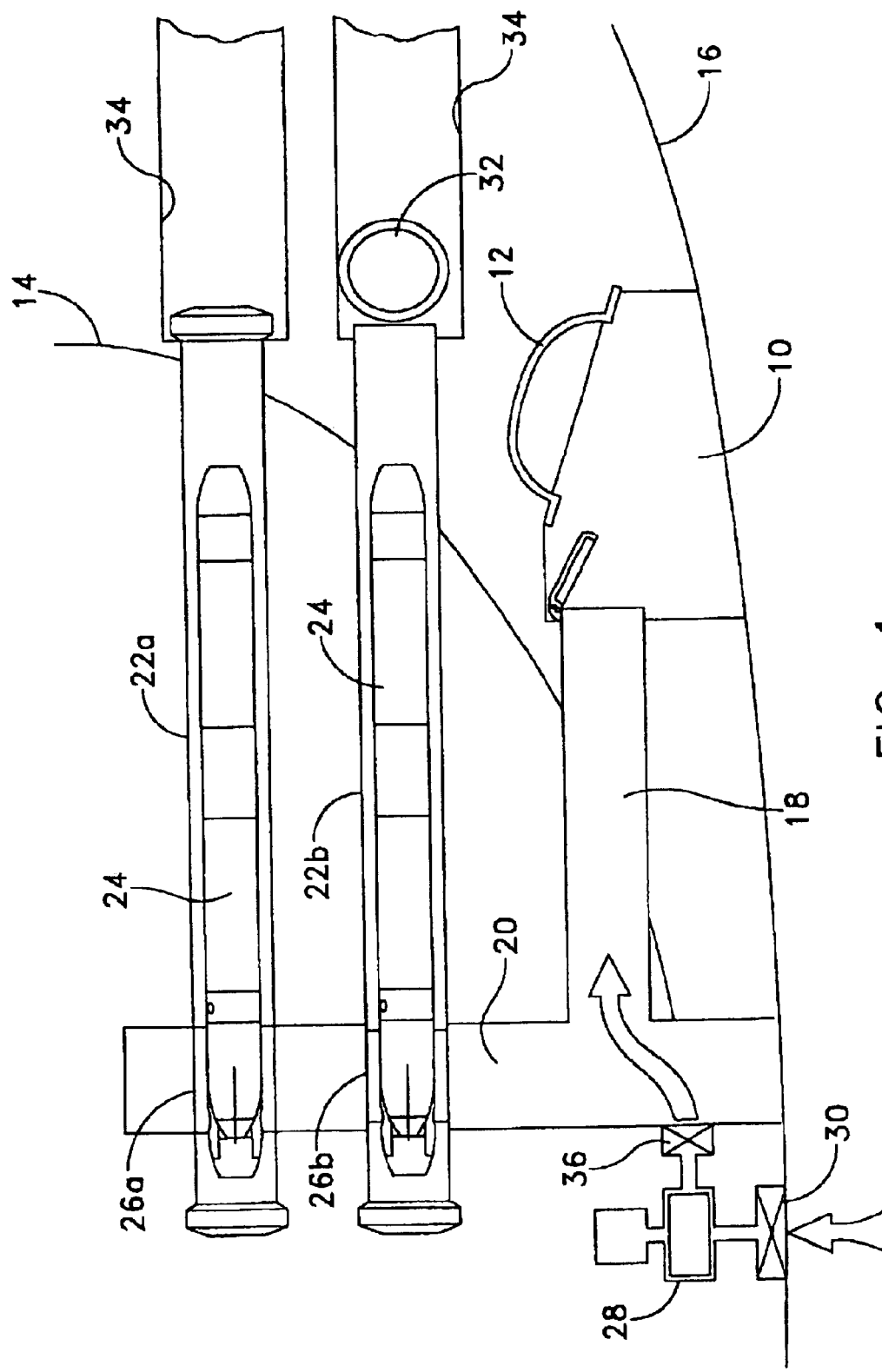
FIG. 1 is a diagrammatic view of an elastomeric ejection system for launching bodies from a submarine, illustrative of an embodiment of the invention.

Referring to FIG. 1, it will be seen that the illustrative system includes an ejection tank 10 defined in part by an elastomeric wall 12, which may be in the form of a disk. The ejection tank 10 is mounted outside of a submarine pressure hull 14 and within an outer hull 16.

An inlet cylinder 18 is in communication with the ejection tank 10 at a forward end of the cylinder 18 and in communication with an impulse tank 20 at an after end of the cylinder.

The impulse tank 20 is disposed for communication with launch tubes 22a, 22b which house torpedoes 24, or other weapons or vehicles. Each launch tube is provided with a slide valve 26a, 26b, respectively. When a slide valve opens, the launch tube affected thereby is placed in communication with the impulse tank 20.

A charging pump 28 is disposed for communication with a sea valve 30, which is exposed to seawater outboard of the submarine pressure hull, and for communication with the ejection tank 10, by way of the inlet cylinder 18, and the impulse tank 20.

Between the charging pump 28 and the impulse tank 20 there is disposed a check valve 36. In charging the ejection tank 10, the charging pump 28 draws seawater from outboard of the pressure hull through the sea valve 30 and flows the seawater through the open check valve 36 to fill and pressurize the impulse tank 20, the inlet cylinder 18, and the ejection tank 10, expanding the elastomeric wall 12 of the ejection tank 10 (FIG. 1).

Upon pressurizing the system to a launch pressure, the charging pump 28 shuts down, as does the sea valve 30, and the check valve 36 is caused by the launch pressure to shut. At this point the system is precharged for a launch.

Figure 3:
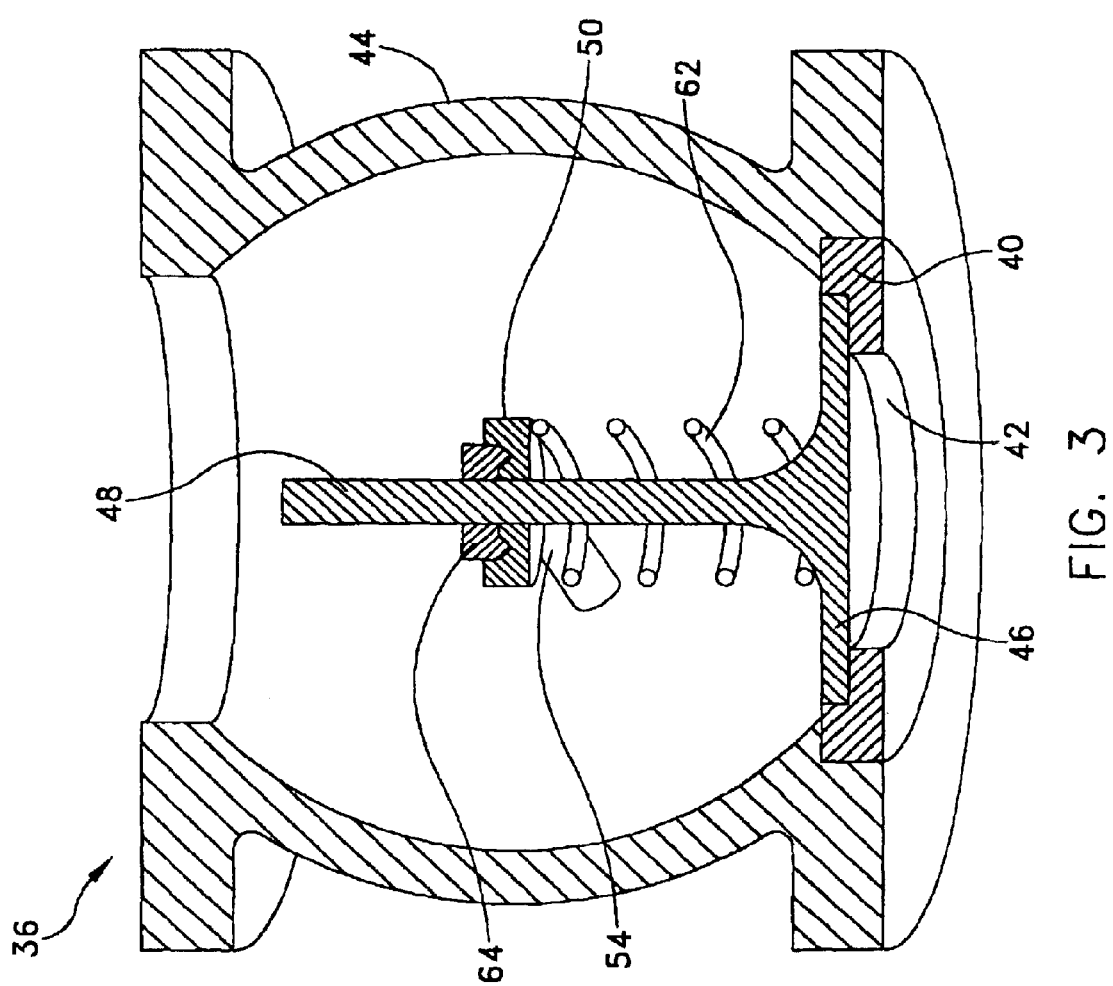
FIG. 3 is a sectional and perspective view of a check valve portion of the system of FIGS. 1 and 2, and illustrating a particular feature of the invention.

Turning to FIG. 3, it will be seen that the check valve 36 includes a housing 44 supporting a valve seat portion 40 provided with a flow-through orifice 42. The valve seat portion 40 is adapted to receive a valve head 46 to close off flow through the valve. The valve head 46 is fixed at an end of a valve stem 48. The orifice 42 is disposed in the direction, flow-wise, of the charging pump 28.

Fixed in the valve housing 44 is an annularly shaped metal cup 50 provided with a circular depression 52 (FIG. 4). The cup 50 is held in a stationary manner within the housing 44 by at least one, and preferably a plurality, of struts 54 (one shown in FIGS. 3 and 4). The valve stem 48 is reciprocally moveable through the center of the cup 50.

The circular depression 52 is, at its bottom end portion 56, of a substantially V-shaped configuration in cross-section, as shown in FIG. 4. Extending radially outwardly from the circular depression bottom end portion 56 are holes 58 which extend to an outer wall 60 of the cup 50.

A coil spring 62 is mounted on the valve stem 48 and extends between the cup 50 and the valve head 46. The spring urges the valve head 46 toward the valve seat portion 40 to close off flow through the valve. However, the spring force is readily overcome by the flow of incoming seawater when the charging pump 28 is in operation.

The valve stem 48 has fixed thereon a curricular metal disk 64 having an annularly-shaped protrusion 66 facing the circular depression 52. The protrusion 66 in cross-section (FIG. 4) is shaped complementarily to the depression 52.

In as much as the disk 64 is fixed to the valve stem 48, which is reciprocably moveable through the cup 50, and the cup 50 is held stationary, the disk protrusion 66 is moveable into and out of the depression 52 as the valve 36 operates.

In preparation for a launch, an appropriate launch tube door 32 is opened to place the torpedo 24 in communication with the outboard seawater through a shutterway 34 (FIG. 1). The charging pump sea valve 30 is opened and the pump 28 pushes incoming seawater against the valve head 46 of the check valve 36, forcing the valve head to move against the spring 62 to open the valve orifice 42.

The seawater is then pumped into the impulse tank 20, inlet cylinder 18, and ejection tank 10, causing the elastomeric wall 12 to expand.

When pressure in the ejection tank 10, impulse tank 20, and inlet cylinder 18 reaches launch pressure, the pump 28 shuts off and such launch pressure, in combination with the spring 62, moves the valve head 46 rapidly toward the valve seat portion 40 to close the valve 36.

During the rapid closure of valve 36, the disk protrusion 66 enters the cup depression 52. As the cross-section of the depression decreases, the water therein can remove itself from the incoming protrusion 66 only by squeezing through either the primary path of a decreasing annular gap between the disk protrusion 66 and cup depression 52 or through the secondary path of the holes 58. The exiting water cannot get out of the way of the protrusion 66 instantly, but rather has to exit through the flow restrictive annular gap and holes. Thus, at the last instant, the movement of the disk 64, and therefore the valve stem 48, and therefore the valve head 46, is slowed into a relatively gradual and "soft" engagement of the valve head 46 with the valve seat position 40. The noise generated by the impact of the valve head and valve seat portion is, accordingly, greatly reduced. Furthermore, the movement of the disk 64 at the last instant allows a rapid closure of the valve 36 in that the pre-movement of the valve head 46 prior to impact with the valve seat portion 40 effectively restricts flow through the valve.

Figure 2:
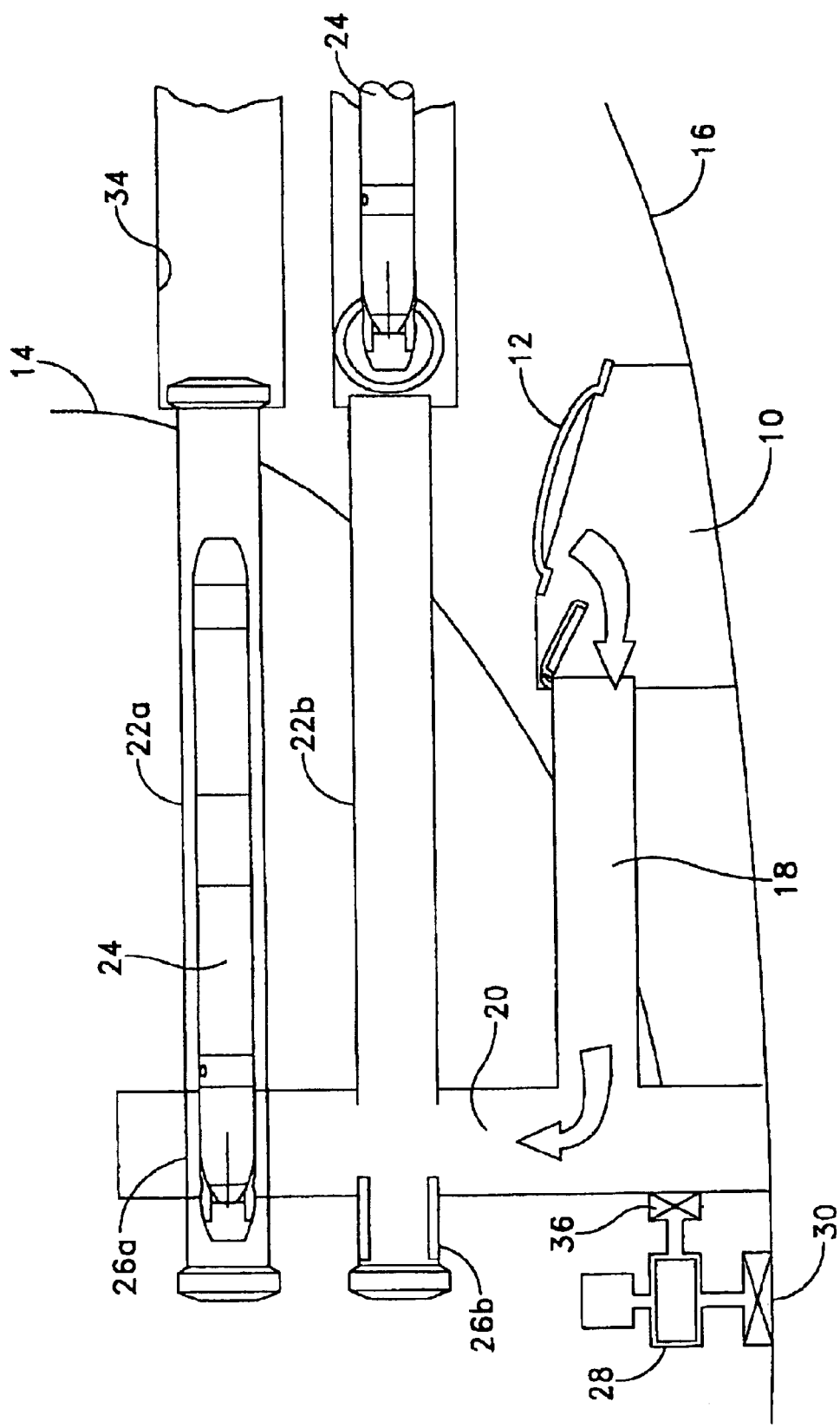
FIG. 2 is similar to FIG. 1, but illustrating the ejection system ejecting a torpedo.

To effect launch, a slide valve, such as 26b is opened (FIG. 1), permitting the pressurized water to enter the torpedo tube 22b to effect launch of a body 24, as shown in FIG. 2. As the pressure in the launch system starts to subside, the elastomeric wall 12 deflates. After launch, the slide valve 22b closes, to set the stage for another cycle of operation.

There is thus provided an elastomeric ejection system in which the check valve operates at a sound level virtually undetectable by other vessels.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. An elastomeric ejection system for launching bodies from a submarine, said system comprising:
   a charging pump for transferring seawater from outside a pressure hull of the submarine to an ejection tank defined at least in part by an elastomeric wall; and
   a check valve adapted to open to permit said charging pump to transfer the seawater to said ejection tank, and adapted to close upon filling of said ejection tank and expanding of said elastomeric wall, said valve having:
   a head;
   a seat portion;
   a stem portion having fixed thereon said head and a disk having a circular protrusion extending toward said valve seat portion;
   an annular cup stationarily mounted around said stem portion and having a circular depression in a surface thereof, said depression configured complementarily to said disk protrusion, and flow restrictive holes disposed in said cup and radially extending from said depression to an outer wall of said cup;

whereby in closure of said check valve, said disk circular protrusion enters said cup depression, forcing seawater in said depression to exit said cup through the primary flow restriction of the annular path between said disk circular protrusion and said cup depression and the secondary flow restriction of said radially extending holes, to slow said valve stem portion, and thereby said valve head in movement into engagement with said valve seat portion.

2. The system in accordance with claim 1 wherein said disk protrusion decreases in cross-section from said disk toward a distal end of said protrusion.

3. The system in accordance with claim 2 wherein said disk protrusion cross-section is substantially paraboloid shaped.

4. The system in accordance with claim 1 wherein said holes in said cup extend radially from said depression to said outer wall of said cup.

5. The system in accordance with claim 1 wherein said holes extend from a bottom portion of said depression.

6. The system in accordance with claim 5 wherein said holes permit less than free-flow of the seawater from said depression.

7. The system in accordance with claim 1 wherein said cup and said disk are of metal.

8. An elastomeric ejection system for launching bodies from a submarine, said system comprising:

a charging pump for transferring seawater from outside a pressure hull of the submarine to an ejection tank defined at least in part by an elastomeric wall;

an impulse tank for receiving water under pressure from said ejection tank;

a launch tube for storing a body to be launched;

a slide valve for placing said impulse tank in communication with said launch tube to permit water from said impulse tank to enter said launch tube to force the body out of said launch tube; and a check valve adapted to open to permit said charging pump to transfer the water from outside the submarine pressure hull to said ejection tank, and adapted to close upon filling of said ejection tank and selected expansion of said elastomeric wall thereof, said check valve having a seat portion and a stem portion, said stem portion having a head at a distal end thereof for engaging said valve seat portion in closure of said valve; said valve further comprising:

a disk fixed on said stem portion and having a circular protrusion extending toward said valve seat portion;

an annular cup mounted in said check valve and having a circular depression in a surface thereof configured complementarily to said disk protrusion creating a primary flow restriction to flow during closure; and flow restriction holes defined by said cup and extending radially from said depression to an outside wall of said cup creating a secondary flow restriction to flow during closure;

whereby in closure of said check valve, said disk circular protrusion enters said cup depression, forcing seawater in said depression to exit said cup through said primary flow restriction of an annular gap between said disk circular protrusion and said cup depression and said secondary flow restriction of said radially extending restriction holes, to slow the movement of said valve stem portion, and thereby said valve head, in movement into engagement with said valve seat portion.

9. The system in accordance with claim 8 wherein said disk protrusion decreases in cross-section from said disk toward a distal end of said protrusion.

10. The system in accordance with claim 9 wherein said disk cross-section is substantially paraboloid shaped.

11. The system in accordance with claim 8 wherein said holes in said cup extend radially from said depression to said outer wall of said cup.

12. The system in accordance with claim 8 wherein said holes extend from a bottom portion of said depression.

13. The system in accordance with claim 12 wherein said holes permit less than free-flow of the seawater from said depression.

14. The system in accordance with claim 8 wherein said cup and said disk are of metal.

15. A spring-activated check valve for use in a pressurized fluid system, said check valve comprising:

a head;

a seat;

a stem having fixed thereon said head and including a disk with a circular protrusion extending toward said seat;

an annular cup mounted in encompassment of said stem, said annular cup having a circular depression in a surface thereof, said depression complimentarily in shape to said disk protrusion with holes disposed in said annular cup and radially extending from said depression to an outer wall of said cup;

whereby during a closure of said check valve by said spring-action, said disk protrusion releasably mates to said depression thereby forcing any of the fluid in said depression through a primary restrictive area of an annular gap between said disk protrusion and said depression and a secondary restrictive area of said radially extending holes in relation to the surface area of said cup thereby dampening the engagement of said head with said valve seat during said closure.

16. The check valve in accordance with claim 15, wherein said disk protrusion decreases in cross-section to said seat.

17. The system in accordance with claim 16 wherein said disk protrusion cross-section is substantially paraboloid shaped.

18. The system in accordance with claim 17 wherein said holes extend radially from said depression to the outer wall of said cup.

19. The system accordance with claim 18 wherein said holes extend from a bottom portion of said depression.

* * * * *